United States Patent [19]

Todt et al.

[11] 4,080,533
[45] Mar. 21, 1978

[54] GAMMA COMPENSATED COAXIAL CABLE

[75] Inventors: William H. Todt, Elmira Heights, N.Y.; Norman P. Goldstein, Delmont, Pa.

[73] Assignee: Westinghouse Electric Corporation, Pittsburgh, Pa.

[21] Appl. No.: 717,966

[22] Filed: Aug. 26, 1976

[51] Int. Cl.² ............................ G01T 1/00; G01T 3/00
[52] U.S. Cl. .................................... 250/336; 250/390
[58] Field of Search ................ 250/390, 391, 392, 336

[56] References Cited

U.S. PATENT DOCUMENTS

| 3,787,697 | 1/1974 | Shields | 250/390 |
|---|---|---|---|
| 3,903,420 | 9/1975 | Klar | 250/390 |
| 3,940,627 | 2/1976 | Klar | 250/390 |
| 4,008,399 | 2/1977 | Brown | 250/390 |

*Primary Examiner*—Davis L. Willis
*Attorney, Agent, or Firm*—W. G. Sutcliff

[57] ABSTRACT

A coaxial electrical signal cable is inherently compensated for gamma flux induced currents by the use of selected alloys for the central conductive wire. The central conductive wire alloy comprises a first metal which interacts with the gamma flux to produce a negative current contribution between the central conductive wire and the conductive sheath, and a second metal which interacts with the gamma flux to produce a positive current contribution, which in combination with the signal produced in the conductive sheath results in a null gamma induced current for the cable.

7 Claims, 2 Drawing Figures

GAMMA COMPENSATED COAXIAL CABLE

BACKGROUND OF THE INVENTION

The present invention relates to coaxial electrical signal cables such as are used with self-powered radiation detectors. A self-powered radiation detector consists of a central emitter, surrounded by an insulator and a conductive collector sheath about the insulator. Such detectors are used to monitor in-core radiation fluxes in power reactors for fuel management and safety applications. One of the major limitations of such self-powered detectors is the gamma induced signal current generated in the cable which connects the detector to the instrumentation panels. The cable is a coaxial electrical signal cable compatible in size with the self-powered detector, and like the detector has a central conductor surrounded by an insulator and by a conductive sheath. An electron current is generated in the coaxial signal cable as a result of being exposed to the gamma flux level present in the reactor. A relatively high background level signal induced in the cable causes degradation of the detector signal, and can also cause error in the detection of localized flux information desired for flux mapping and safety system applications.

It has been the practice to utilize a gamma compensation technique to improve the detector signal current to background current ratio in such self-powered radiation detector systems. The present state of the art is to use a second coaxial cable identical in structure and dimension to the self-powered detector and signal cable. The second cable does not have an emitter as such, but rather a conventional center conductor. The center conductors of the two cables are connected across the input terminals of a millivolt recorder. The two center conductors are connected to ground through identical load resistances, and the measured potential difference is directly proportional to the difference between the currents in the two cables. In principle, the difference should be equal to the detector current. Such gamma compensation techniques are deficient in that it is in fact difficult to match the coaxial cables such that they have identical total mass and geometry to make the compensation valid. Radiation gradients also exist within the core thimbles which can give rise to compensation signal errors. Also, a very limited area is available within the core for such self-powered detectors and the use of such compensation cables severely limits the number of actual detectors which can be utilized in an in-core assembly array.

An inherently gamma compensated cable is disclosed in U.S. Pat. No. 3,892,969, in which gamma induced currents are minimized or negated through selection of conductor and cable sheath materials and sizes. This prior art patent teaches selection of a convenient alloy such as Zircalloy as the emitter or as the central conductor of the coaxial signal cable and prescribes specific dimensions for the center cable diameter and the sheath to achieve compensation. The problem with this approach is that the prescribed dimensions may violate the mechanical constraints on the system, such as maximum size, thus making it inconvenient to use.

SUMMARY OF THE INVENTION

It has been discovered that an inherent gamma compensated coaxial electrical signal cable can be produced wherein the central conductive wire is an alloy of a first metal which gives rise to a negative current contribution, and a second metal which produces a positive current contribution which cumulative signals substantially negate the gamma signal produced in the condutive sheath of the cable. The electrical signal cable comprises a central conductive wire, insulating means about the central conductive wire, and a conductive sheath about the insulation means. The central conductive wire is preferably an alloy of nickel and a selected metal which is at least one of molybdenum, niobium, and zirconium. The advantage of this approach is that the cable dimensions can be selected solely to satisfy the mechanical constraints of the system and compensation is then achieved by using the appropriate ratio of the metals which form the alloy.

DESCRIPTION OF THE PREFERRED EMBODIMENT

Figure 1:
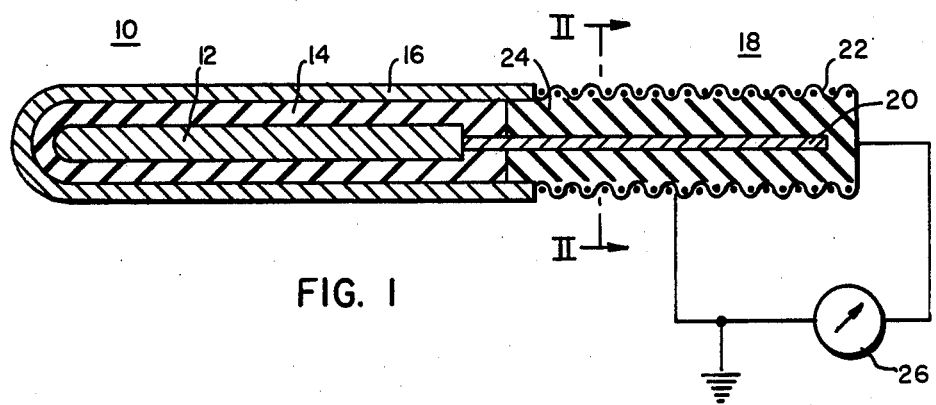
FIG. 1 is a schematic illustration of a self-powered neutron detector system which includes the detector, the coaxial signal cable and an indicating current meter.
Figure 2:
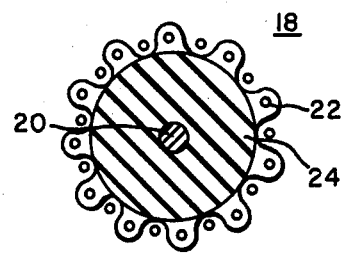
FIG. 2 is a cross-sectional view taken through the coaxial signal cable seen in FIG. 1.

The invention can be best understood by reference to the drawings in which the self-powered neutron detector 10 comprises a high neutron cross-section conductive emitter 12, such as platinum, surrounded by an insulator 14, such as aluminum oxide, and a conductive collector sheath 16 of Inconel. The neutron detector 10 is joined to a coaxial electrical signal cable 18, the center wire 22 of which is connected to the emitter 12 with the coaxial cable sheath 22 connected to the collector sheath 16 of the neutron detector. An insulator layer 24 is provided between the center wire 20 and the sheath 22. The coaxial cable may extend for many feet and is remotely connected to a current meter 26 with the coaxial sheath being grounded.

The coaxial signal cable 18 typically has an outside diameter of from 0.040 to 0.060 inch, and has an Inconel nickel alloy steel, high temperature resistant, low neutron cross-section sheath 22. Inconel is a trademark of International Nickel Co. for a high nickel content specialty steel which also includes substantial chromium as well as iron. The Inconel sheath 22 preferably has a thickness of 0.010 inch. The insulator material of layer 24 which surrounds the center wire 20 is preferably aluminum oxide and is about 0.010 inch thick. Other high temperature resistant, non-reactive insulators may be utilized. The center wire 20 preferably has a diameter of from about 0.005 to 0.020 inch.

The present invention relates to the selection of the center wire material 20 of the coaxial electrical signal cable 18. The center wire must be a good electrical conductor, and have a high melting point since the cable will be disposed within the core of a reactor. The wire must be highly ductile to be able to be drawn into very small diameter wire. The conductor material of the wire must have a very low neutron cross-section to minimize direct neutron activation. It has been discovered that when the sheath 22 is Inconel, the center wire metal can be a nickel alloy to achieve gamma compensation for the cable. The central conductive wire can thus be formed of an alloy of a nickel which interacts with the gamma flux to produce a negative current contribution between the center conductive wire and the conductive sheath, (made of Inconel) and a second metal which interacts with the gamma flux to produce a positive current contribution which substantially produces a null gamma induced current for the cable. The second metal which is the positive current contribution element should be selected from at least one of the group of molybdenum, niobium, and zirconium. It has been discovered that a particularly advantageous range of alloy compositions includes from 70% to 96% by weight nickel and from 30% to 5% by weight molybdenum. The exact nickel-molybdenum ratio required to achieve compensation will depend on the actual dimensions of the cable. The nickel-molybdenum alloys in this range all have the requisite properties for the center wire and exhibit an inherently gamma compensated characteristic.

We claim:

1. An electrical signal cable which is inherently compensated for gamma induced currents comprising:

a central conductive wire, insulation means about the central conductive wire, and a conductive sheath about the insulating means having a low neutron cross-section, the improvement wherein the central conductive wire is an alloy of nickel and a selected metal which produces a current contribution as a result of gamma flux interaction which nullifies the gamma flux interaction current resulting from the nickel and the condutive sheath.

2. An electrical signal cable as claimed in claim 1 wherein the selected metal is at least one of molybdenum, niobium, and zirconium.

3. An electrical signal cable as claimed in claim 1 wherein the central conductive wire is a nickel-molybdenum alloy, with the molybdenum content being about 5 to 30 percent by weight.

4. The electrical signal cable as claimed in claim 1, wherein the conductive sheath is a high nickel content alloy steel.

5. An electrical signal cable which is inherently compensated for gamma induced currents comprising a central conductive wire, insulating means about the central conductive wire, and a conductive sheath about the insulating means having a low neutron cross-section, the improvement wherein the central conductive wire is an alloy of a first metal which interacts with the gamma flux to produce a negative current contribution between the central conductive wire and the conductive sheath, and a second metal which interacts with the gamma flux to produce a positive current contribution which substantially produces a null gamma induced current for the cable.

6. The electrical signal cable as claimed in claim 5, wherein the conductive sheath is a high nickel content steel, and the central conductive wire is a nickel-molybdenum alloy.

7. The electrical signal cable as claimed in claim 6, wherein the molybdenum content is from about 5 to 30 percent by weight of the nickel.

* * * * *